(No Model.)
J. W. SPAFFORD.
FASTENING FOR END GATES.
No. 349,537. Patented Sept. 21, 1886.
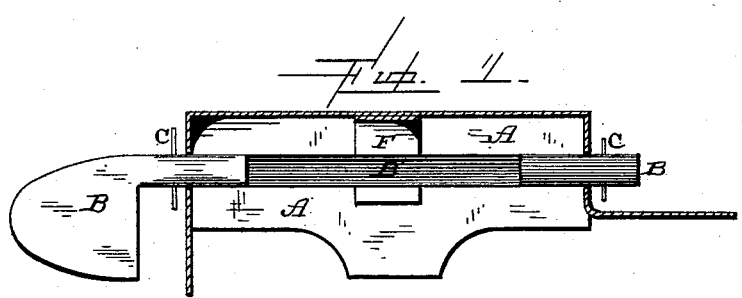
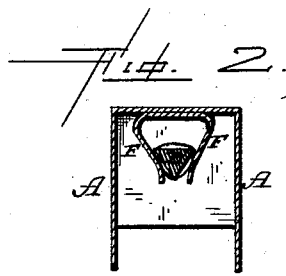
Witnesses.
R. F. Gardner
A. W. Brecht
Inventor.
J. W. Spafford,
per F. A. Lehmann,
Atty.

UNITED STATES PATENT OFFICE.

JOHN WALLACE SPAFFORD, OF AKRON, OHIO.

FASTENING FOR END-GATES.

SPECIFICATION forming part of Letters Patent No. 349,537, dated September 21, 1886.

Application filed March 12, 1886. Serial No. 194,935. (No model.)

*To all whom it may concern:*

Be it known that I, JOHN WALLACE SPAFFORD, of Akron, in the county of Summit and State of Ohio, have invented certain new and useful Improvements in Fastenings for End-Gates of Wagons; and I do hereby declare the following to be a full, clear, and exact description of the invention, such as will enable others skilled in the art to which it pertains to make and use it, reference being had to the accompanying drawings, which form part of this specification.

My invention relates to an improvement in fastenings for end-gates of wagons; and it consists in the combination of a suitable frame, which is applied to the top edge of the rear end of the wagon-body, a U-shaped spring, which is placed in the body, and a catch, which is made triangular at the center of its shank, where it passes through the spring, as will be more fully described hereinafter.

The object of my invention is to provide a cheap and simple fastening for end-gates of wagons, and in which the catch is held in any desired position by means of a U-shaped spring.

Figure 1 is a vertical section taken through the frame to one side of the catch. Fig. 2 is a vertical cross-section of the same, taken through the spring.

A represents a suitable inclosing-case, which is adapted to be fastened to the top edge of the rear end of the wagon bed or body, and through which the catch B passes. This catch is provided with a shank, which is long enough to extend horizontally through the body, and through which shank, at each end of the body, is passed a holding device, C, of any suitable construction, and which prevents the catch from moving endwise and thus becoming displaced. The central portion of this shank is made triangular, as shown at B', where it passes through the U-shaped spring F, which is secured to the under side of the top bar of the frame. This spring has its ends to approach very near to each other, so as to correspond to the shape of the triangular portion of the shank, whereby when an attempt is made to turn the catch in either direction this triangular portion of the shank will act as a wedge to force the ends of the spring apart, and thus cause the two prongs of the spring to impinge against the edges of the shank with sufficient force to hold the catch in any position into which it may be adjusted. When the end-gate is to be opened or closed, the catch is turned partially around, so as not to engage with the top edge of the gate; but after the gate has been closed the catch is turned down, so as to catch over its top edge, and thus hold it in position. This catch, as above constructed, is also adapted to be used in fastening a wagon-seat to the box.

Having thus described my invention, I claim—

The combination of the frame, the catch B, having a shank which is made triangular in cross-section, and the U-shaped spring, which is applied to the under side of the top of the frame, and which holds the catch in any position into which it may be adjusted, substantially as shown and described.

In testimony whereof I affix my signature in presence of two witnesses.

JOHN WALLACE SPAFFORD.

Witnesses:
BIRT MOON,
JAMES NICHOLS.